US010464542B2

(12) United States Patent
Charpentier et al.

(10) Patent No.: US 10,464,542 B2
(45) Date of Patent: Nov. 5, 2019

(54) BRAKE FLUID RESERVOIR VALVE FOR A MASTER CYLINDER

(71) Applicant: Robert Bosch GmbH, Stuttgart (DE)

(72) Inventors: Carole Charpentier, Montmorency (FR); David Bazaud, Colombes (FR); Eligiusz Stefaniak, Wroclaw (PL); Laurent Lhuillier, Le Blanc Mesnil (FR); Sebastien Dusch, Saint-Maur-des-Fosses (FR)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 15/534,779

(22) PCT Filed: Dec. 11, 2015

(86) PCT No.: PCT/EP2015/079450
§ 371 (c)(1),
(2) Date: Jun. 9, 2017

(87) PCT Pub. No.: WO2016/096659
PCT Pub. Date: Jun. 23, 2016

(65) Prior Publication Data
US 2017/0369045 A1 Dec. 28, 2017

(30) Foreign Application Priority Data
Dec. 19, 2014 (FR) ..................... 14 62950

(51) Int. Cl.
*B60T 11/28* (2006.01)
*B60T 11/26* (2006.01)
(Continued)

(52) U.S. Cl.
CPC .............. *B60T 11/26* (2013.01); *B60T 11/22* (2013.01); *B60T 11/228* (2013.01); *B60T 11/28* (2013.01);
(Continued)

(58) Field of Classification Search
CPC ........ B60T 11/28; B60T 11/32; B60T 11/323; F16L 37/42
See application file for complete search history.

(56) References Cited

U.S. PATENT DOCUMENTS 1,813,581 A * 7/1931 Rodrigues ............. F16L 37/252
239/541
4,934,144 A * 6/1990 Larin ...................... B60T 11/26
251/149.6
(Continued)

FOREIGN PATENT DOCUMENTS

CN 1156228 A 8/1997
CN 102627102 A 8/2012
(Continued)

OTHER PUBLICATIONS

International Search Report for PCT/EP2015/079450, dated Feb. 29, 2016.

*Primary Examiner* — F Daniel Lopez
(74) *Attorney, Agent, or Firm* — Norton Rose Fulbright US LLP; Gerard Messina

(57) ABSTRACT

Brake fluid reservoir valve for installation in the reservoir's outlet tube. It includes an outer sleeve fixed in the reservoir tube and equipped with an outer stop and a hollow piston housed in the sleeve. The top of the piston is closed and bordered by a groove accommodating an o-ring seal that rests upon the upper edge of the sleeve whenever the piston enters the sleeve. The piston has windows beneath the groove communicating with the interior of the piston and lugs near its lower extremity. Openings are provided in the extension of the piston beneath the lugs. A compression spring is inserted between the piston and the outer sleeve, between the stop and the lugs.

9 Claims, 3 Drawing Sheets

(51) Int. Cl.
*B60T 11/22* (2006.01)
*B60T 11/228* (2006.01)
*B60T 11/32* (2006.01)
*B60T 17/06* (2006.01)
*B60T 17/04* (2006.01)

(52) U.S. Cl.
CPC ............ *B60T 11/323* (2013.01); *B60T 17/06* (2013.01); *B60T 17/04* (2013.01)

(56) References Cited

U.S. PATENT DOCUMENTS

| | | | | |
|---|---|---|---|---|
| 5,628,726 A | * | 5/1997 | Cotter | A61M 39/14 137/614.04 |
| 5,634,624 A | * | 6/1997 | Lacroix | F16L 37/413 251/149.6 |
| 2012/0011844 A1 | | 1/2012 | Albert et al. | |
| 2013/0341917 A1 | * | 12/2013 | Lehmann | F16L 37/22 285/351 |
| 2016/0052497 A1 | * | 2/2016 | Krebs | B60T 11/22 303/84.1 |
| 2016/0075317 A1 | * | 3/2016 | Lemke | B60T 11/22 60/591 |

FOREIGN PATENT DOCUMENTS

| | | |
|---|---|---|
| DE | 19639560 A1 | 4/1998 |
| DE | 102013006870 A1 | 10/2014 |
| EP | 0063998 A1 | 11/1982 |
| EP | 0340186 A1 | 11/1989 |
| EP | 2216220 A1 | 8/2010 |
| GB | 687304 A | 2/1953 |
| GB | 2114246 A | 8/1983 |
| WO | 03012331 A1 | 2/2003 |

\* cited by examiner

BRAKE FLUID RESERVOIR VALVE FOR A MASTER CYLINDER

FIELD OF THE INVENTION

The present invention concerns a brake fluid reservoir valve supplying a master cylinder, in particular, a tandem master cylinder.

BACKGROUND INFORMATION

Currently, brake system master cylinders are equipped with a brake fluid reservoir installed on one or both of the master cylinder's supply fittings, depending on whether the master cylinder is simple or tandem. The brake fluid in the brake fluid reservoir or discharged during the braking and ESP system operation phase passes freely from the reservoir into the chamber or chambers of the master cylinder.

If the reservoir is unmounted for maintenance, it must be emptied to prevent brake fluid from spilling.

In the event of an accident, if the reservoir is torn from the master cylinder, the brake fluid, which is combustible, may reach the very hot surfaces of the engine and cause a fire.

SUMMARY OF THE INVENTION

An object of the present invention is to provide an arrangement or apparatus for preventing brake fluid from leaking from the reservoir, normally installed in the master cylinder (tandem master cylinder) to supply the primary and/or secondary chamber. The goal of the invention is to provide an arrangement or apparatus for preventing brake fluid leaks whenever the reservoir is unmounted and still contains a given amount of brake fluid, even quite small amounts, or if the brake fluid reservoir is accidentally detached from the master cylinder, for example, in the event of a collision, to prevent brake fluid from making contact with the very hot surfaces found in the engine compartment and causing a fire.

DISCLOSURE AND BENEFITS OF THE INVENTION

To that end, the object of the invention is a valve for a brake fluid reservoir supplying a master cylinder and mounted in an outlet nozzle of the reservoir on the interface with the master cylinder (tandem master cylinder), comprising:

A—an external sleeve fixed in the reservoir tube, equipped with an external mounting and support stop, B—a hollow piston housed in the sleeve,
- closed on its upper extremity, surrounded by a groove accommodating an o-ring seal and pressing against the upper edge of the sleeve whenever the piston has entered the sleeve,
- windows beneath the groove communicating with the interior of the piston,
- lugs near its lower extremity,
- openings in the extension of the piston beneath the lugs, C—a compression spring mounted between the stop and the lugs to retract the piston into the sleeve, the seal coming to rest against the upper edge of the sleeve.

The brake fluid valve according to the invention, integrated into the reservoir tube, can be used to automatically close this tube to prevent the escape of brake fluid when the brake fluid reservoir is unmounted from the master cylinder for repair or maintenance, or even if the reservoir is accidentally detached from the master cylinder in the event of a collision of the vehicle.

This reservoir valve enables the normal passage of brake fluid from the reservoir to the chamber or chambers of the master cylinder whenever the reservoir is connected to the master cylinder supply ports in such a way that the valve is practically transparent to the brake fluid and doesn't play a role in the operation of the braking system. It is only when the reservoir is removed from the master cylinder that the valve(s) close(s) automatically and prevent(s) even small amounts of brake fluid from escaping from the reservoir and soiling the motor or, in the event of a collision, constituting a source of risk of fire in the vehicle.

According to another advantageous characteristic, the sleeve has a crown of lugs forming the stop distributed around its periphery.

According to another advantageous characteristic, the piston has several lugs distributed around its periphery in a plane perpendicular to the axis of the piston, thereby forming a support surface for the compression spring as well as a stop surface limiting the movement of the piston in the external sleeve.

According to another advantageous characteristic, the sleeve has two mounting collars to engage and hold the sleeve by force in the brake fluid reservoir tube.

In general, the reservoir valve according to the invention is a very simple component to manufacture with respect to both its parts and its assembly. Its installation in the reservoir tubes is also a very simple operation, given that, overall, the reservoir valve doesn't complicate the manufacture of the brake fluid reservoir or its installation on the master cylinder.

Another object of the invention is a brake fluid reservoir whose tube(s) are equipped with a valve as described above.

The present invention will be described in greater detail by an embodiment of a brake fluid reservoir valve, shown in the attached drawings.

DETAILED DESCRIPTION

Reservoir valve 100 according to the invention is intended to be housed in a brake fluid reservoir tube installed on the supply ports of a braking system master cylinder. By convention, the orientation used to describe the valve is the natural orientation of the valve when installed in the reservoir tube, itself in the natural position, which is to say, vertical, the tube being turned toward the bottom.

In the case of a tandem master cylinder, it has two tubes, each of which is equipped with valve 100 according to the invention. When valve 100 is installed in the tube, it is naturally closed. It is only open when the reservoir is installed in the master cylinder and it remains open as long as the reservoir is installed. When the reservoir is removed from the master cylinder, valve 100 closes and blocks the tube.

Figure 1:
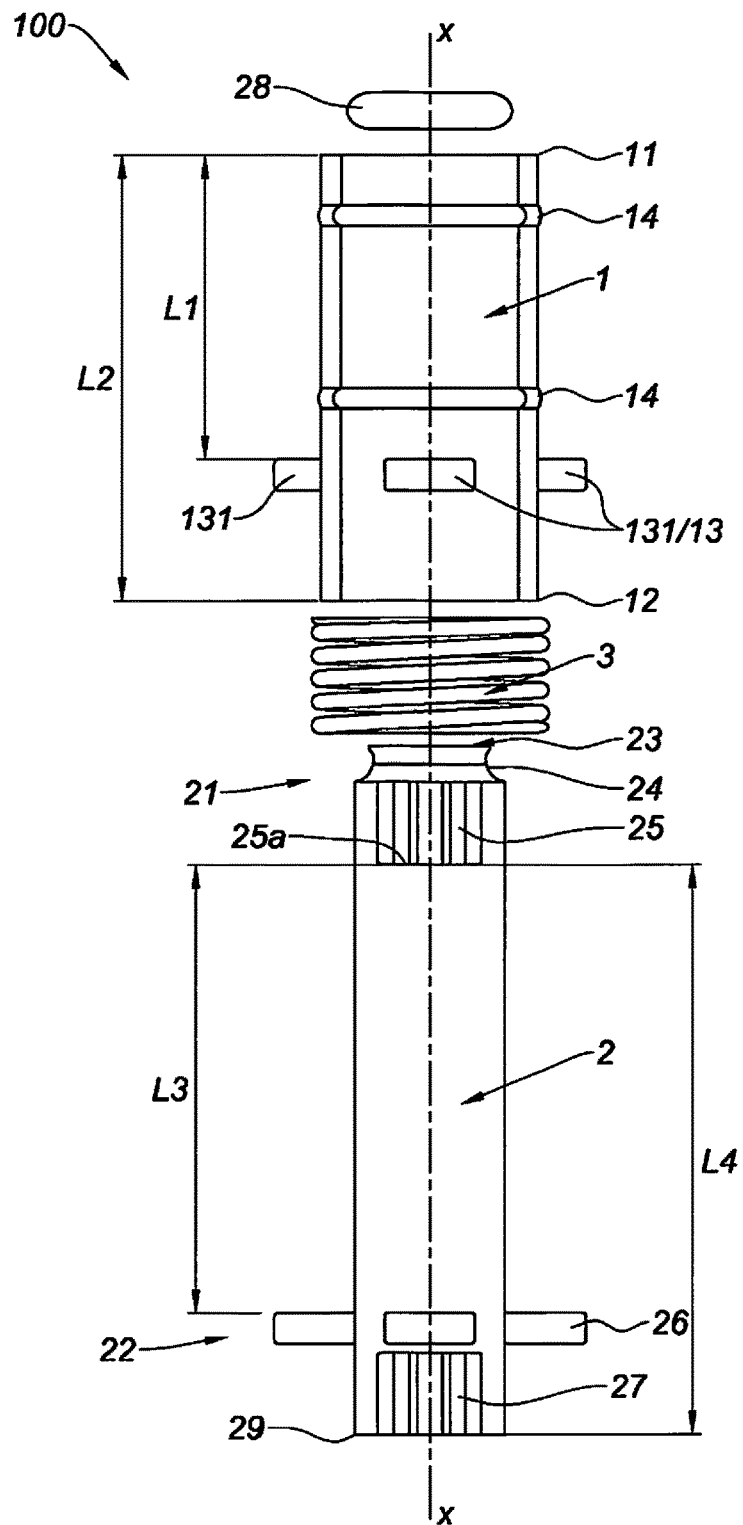
FIG. 1 is a front view of a brake fluid reservoir valve according to the invention in the unassembled state.

Based on the exploded view aligned along axis xx of FIG. 1, brake fluid reservoir valve 100 consists of external sleeve 1 culminating in two extremities 11, 12, and having, on its lower portion, installation stop 13 formed by a crown of radial, peripheral tongues 131, to function as an installation stop resting upon the edge of the brake fluid reservoir port.

The crown is formed of four tongues 131 distributed equidistantly around the periphery.

Above installation stop 13, the external surface of sleeve 1 has two continuous peripheral lips 14, to create a tight fit for sleeve 1 in the nozzle of the brake fluid reservoir.

The height L1 (length) of sleeve 1, along the portion above stop 13, corresponds, overall, to the length of the reservoir tube.

The total length, L2, of sleeve 1 is that comprised between its extremities 11, 12.

Valve 100 has piston 2, formed of a cylinder at upper extremity 21 with closed top 23, engages with external sleeve 1, acting as a piston bushing.

Upper extremity 21 of piston 2 is equipped with peripheral groove 24 to accommodate o-ring seal 28, which, when installed, extends beyond the outside surface of piston 2.

Beneath peripheral groove 24, piston 2 has windows 25 traversing the piston wall to enable communication between the outside and the inside of the piston.

Near its lower extremity 22, piston 2 has a crown of radial lugs 26 acting as a support and stop, and beneath this crown of lugs 26, the piston has openings 27 cut into the piston wall.

Length L3 is the distance between the top of lugs 26 along lower edge 25a of windows 25, and length L4 is the length of piston 2 comprised between its lower side 29 and lower edge 25a of windows 25.

Helical compression spring 3 is installed around the sleeve between crown of lugs 31 of stop 13 and lugs 26 of piston 2. Helical spring 3 has an internal diameter at least greater than the external diameter of the portion of external sleeve 1 located beneath crown of lugs 131.

Figure 2C:
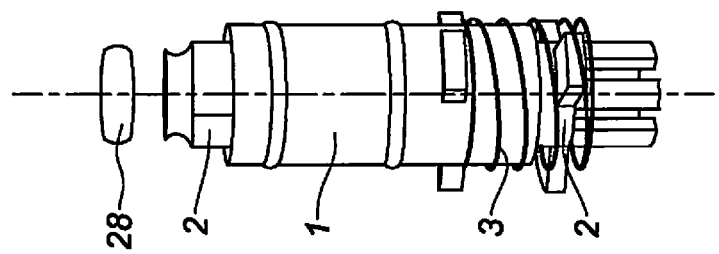
FIG. 2C illustrates the third of the three principal assembly stages of the brake fluid reservoir valve, in which the piston is engaged in the external sleeve with compression of the spring, so that the upper extremity of the piston protrudes beyond the sleeve for installation of the o-ring seal.
Figure 2B:
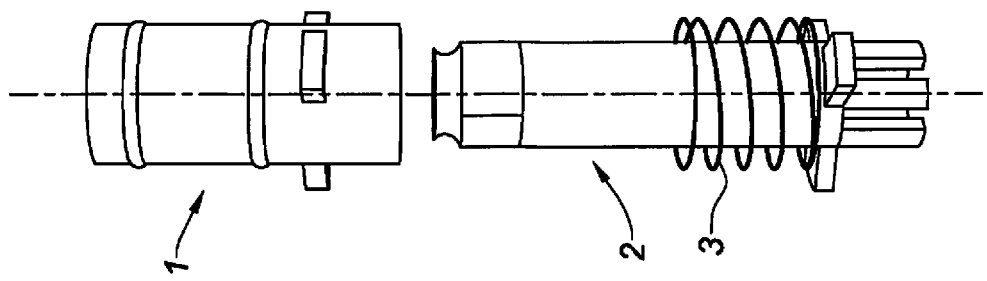
FIG. 2B illustrates the second of the three principal assembly stages of the brake fluid reservoir valve, in which assembly of the piston is equipped with the spring on the external sleeve of the valve.
Figure 2A:
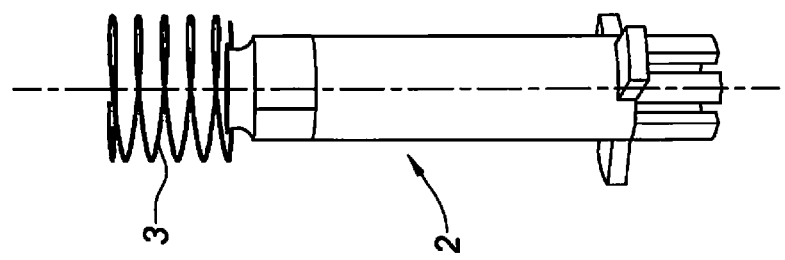
FIG. 2A illustrates the first of the three principal assembly stages of the brake fluid reservoir valve, in which piston and compression spring during assembly of the spring on the piston.

The assembly of the components (1, 2, 3, 26) of reservoir valve 100 is shown in FIGS. 2A, 2B, 2C.

The first assembly step (FIG. 2A) consists in guiding helical spring 4 onto piston 2, above retaining lugs 26.

Then, in the following step (FIG. 2B), piston 2 is engaged from below within external sleeve 1, the interior diameter of the helical spring being, as shown, greater than the external diameter of sleeve 1, at least for the portion of sleeve 1 situated beneath stop 13.

In the third assembly step (FIG. 2C), sleeve 1 is pushed onto piston 2 by compressing spring 3 between crown of tongues 131 of stop 13 and lugs 26 so that at least groove 24 of piston 2 extends above sleeve 1 and enables the installation of o-ring seal 28 in groove 24. O-ring seal 28 thereby provides not only a seal between piston 2 and external sleeve 1 but also serves as a support for piston 2 on the top of sleeve 1 against the force provided by spring 3.

Figure 3A:
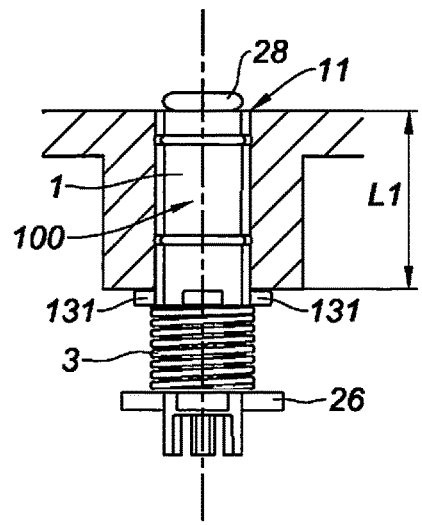
FIG. 3A illustrates a state of the brake fluid reservoir valve according to the invention, in which the valve is in its natural, closed position.
Figure 3B:
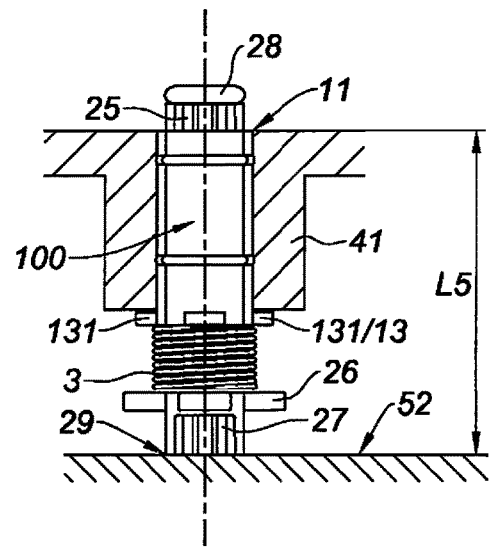
FIG. 3B illustrates another state of the brake fluid reservoir valve according to the invention, in which the valve in its open position, when the reservoir is installed on the master cylinder.

FIGS. 3A and 3B illustrate the two extreme positions of valve 100 during the movement of piston 2 in sleeve 1.

FIG. 3A illustrates the natural position of valve 100 after assembly. Compression spring 3 pushes piston 2 downward until o-ring seal 28 rests on the top of sleeve 1, thereby serving both as a limit stop and a sealing arrangement between the upper portion of piston 2 and sleeve 1. This figure shows the engagement of length L1 of sleeve 1 in nozzle 41 of the reservoir.

FIG. 3B shows the open position of valve 100: sleeve 1 is installed in tube 41 and tube 41 of the reservoir is installed in the port of the master cylinder, piston 2 resting against bottom 52 of the port. Piston 2 is raised and lifted to partially or completely free windows 25 above upper edge 11 of sleeve 1, thereby enabling the passage of liquid through piston 2 between the entrance formed by windows 25 and the exit formed by openings 27.

FIG. 3B, in parallel with FIG. 3A, illustrates distance L5, separating bottom 52 of the end piece of the master cylinder and the top of nozzle 41. This distance may be equal to length L4 so that windows 25 are completely unobstructed and create no restriction for the liquid. The surface of windows 25 may be at least equal to that of openings 27.

Figure 4:
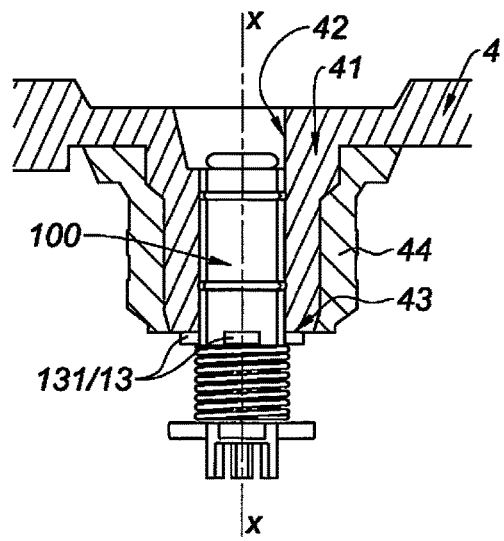
FIG. 4 shows a cutaway view of the brake fluid reservoir end piece equipped with the valve in closed position, the reservoir not being installed in the master cylinder.
Figure 5:
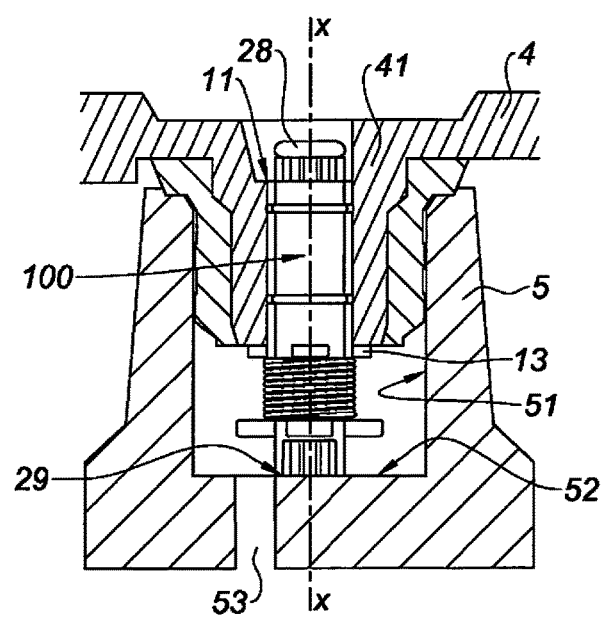
FIG. 5 is a cutaway view similar to that of FIG. 4, showing the brake fluid reservoir nozzle equipped with the valve, engaged in the master cylinder end piece, the valve being in the open position.

FIGS. 4 and 5 show the two states of operation of valve 100, described above.

As shown by FIG. 4, valve 100 is installed in tube 41 of brake fluid reservoir 4 so that its installation stop 13 is applied against entrance 43 of tube 41 and so that its outer surface, above stop 13, appreciably corresponds to the height (length) of the portion of tube 41 in which this length L1 of sleeve 1 is tightly engaged (see FIGS. 1 and 3A).

In this position, valve 100 is closed because spring 3 pushes piston 2 until the end-of-travel position, fixed by the pressure of o-ring seal 28 upon the top of sleeve 1. Valve 100 is closed and the liquid in the reservoir cannot pass through.

As shown in FIG. 5, brake fluid reservoir 4 is installed into supply port 5 of the master cylinder through its tube 41. This port 5 is a cylindrical housing, 51, with bottom 52 and passage 53 to the chamber of the master cylinder (primary chamber and/or secondary chamber). Tube 41 is mounted in supply port 51 and bottom 29 of piston 2 rests against bottom 52 of chamber 51 of port 5 in such a way that, given the dimensional relations illustrated in FIGS. 1, 3A, 3B, piston 2 is raised by compressing spring 3 so that the top of piston (2) and its windows 25 exit from the top (11) of sleeve 1 and are thereby freed to enable the unrestricted passage of liquid between the brake fluid reservoir 4 and the chamber of the master cylinder.

In the example shown, tube 41 of reservoir 4 has rubber sleeve 44, which slides in port 5 of the master cylinder.

The REFERENCE KEY is as follows:
100 Valve
1 External sleeve
11 Upper extremity of the sleeve
12 Lower extremity of the sleeve
13 Installation stop 131 Tongue
14 Mounting collar
2 Piston
21 Upper extremity of piston
22 Lower extremity of piston
23 Closed top
24 Groove
25 Window
26 Lug
27 Opening
28 O-ring seal
3 Spring
4 Brake fluid reservoir
41 Reservoir tube
42 Lower cylinder of tube
43 Lower edge of tube
44 Sleeve
5 Master cylinder
51 Supply port
52 Bottom of supply port
53 Supply port passage

The invention claimed is:

1. A brake fluid reservoir valve for supplying a master cylinder and mountable in an exit tube of a reservoir on an interface with the master cylinder, comprising:
an external sleeve fixable in the exit tube of the reservoir, including an external installation and support stop;
a hollow piston housed in the external sleeve, closed on its upper extremity, surrounded by a groove accommodating an o-ring seal, windows beneath the groove communicating with an interior of the piston, lugs near its lower extremity, openings in an extension of the piston beneath the lugs; and
a compression spring mounted between the stop and the lugs to retract the piston into the external sleeve, wherein:
in a closed state of the valve, the piston is retracted into the external sleeve so that the o-ring seal rests on an upper edge of the external sleeve,
in an open state of the valve, a top of the piston extends distally from the upper edge of the external sleeve and the o-ring seal is moved distally out of contact with the upper edge of the external sleeve, and
the sleeve has a crown of lugs forming the stop distributed along its periphery.

2. The valve of claim 1, wherein the piston has several lugs distributed along its periphery in a plane perpendicular to an axis of the piston.

3. A brake fluid reservoir valve for supplying a master cylinder and mountable in an exit tube of a reservoir on an interface with the master cylinder, comprising:
an external sleeve fixable in the exit tube of the reservoir, including an external installation and support stop;
a hollow piston housed in the external sleeve, closed on its upper extremity, surrounded by a groove accommodating an o-ring seal, windows beneath the groove communicating with an interior of the piston, lugs near its lower extremity, openings in an extension of the piston beneath the lugs; and
a compression spring mounted between the stop and the lugs to retract the piston into the external sleeve, wherein:
in a closed state of the valve, the piston is retracted into the external sleeve so that the o-ring seal rests on an upper edge of the external sleeve,
in an open state of the valve, a top of the piston extends distally from the upper edge of the external sleeve and the o-ring seal is moved distally out of contact with the upper edge of the external sleeve, and
the sleeve has two mounting collars to engage with and hold the sleeve by force in the tube of the brake fluid reservoir.

4. A brake fluid reservoir having at least one brake fluid reservoir valve, comprising:
a reservoir exit tube;
wherein the at least one brake fluid reservoir valve, which is mounted in the reservoir exit tube, includes:
an external sleeve fixed in the reservoir exit tube, including an external installation and support stop;
a hollow piston housed in the external sleeve, closed on its upper extremity, surrounded by a groove accommodating an o-ring seal, windows beneath the groove communicating with the interior of the piston, lugs near its lower extremity, openings in an extension of the piston beneath the lugs; and
a compression spring mounted between the stop and the lugs to retract the piston into the external sleeve, wherein:
in a closed state of the valve, the piston is retracted into the external sleeve so that the o-ring seal rests on an upper edge of the external sleeve,
in an open state of the valve, a top of the piston extends distally from the upper edge of the external sleeve and the o-ring seal is moved distally out of contact with the upper edge of the external sleeve, and
the sleeve has a crown of lugs forming the stop distributed along its periphery.

5. A brake fluid reservoir valve for supplying a master cylinder and adapted to be mounted in an exit tube of a reservoir that is adapted to engage in a port of the master cylinder, the valve comprising:
an external sleeve accommodating a closing element, wherein:
the sleeve is adapted to be fixed in the exit tube of the reservoir and is equipped with an external installation and support stop,
the closing element is a hollow piston housed in the sleeve, wherein the piston includes:
a closed upper extremity, surrounded by a groove accommodating an o-ring seal that rests on an upper edge of the sleeve whenever the piston has entered the sleeve,
windows beneath the groove and communicating with an interior of the piston,
lugs near a lower extremity of the piston, and
openings in an extension of the piston beneath the lugs; and
a compression spring mounted between the support stop and the lugs to retract the piston into the sleeve, wherein:
the seal comes to rest against the upper edge of the sleeve,
the piston is movable in the sleeve between a closed position of the valve and an open position of the valve when the valve is mounted in the exit tube of the reservoir and the piston is installed in the port of the master cylinder,
in the open position, the piston is lifted via a contact of the piston against a bottom of the port so that the windows are moved to a position in which the windows are disposed partially or completely above the upper edge of the sleeve.

6. The valve of claim 5, wherein the lugs are distributed along a periphery of the piston in a plane perpendicular to an axis of the piston.

7. The valve of claim 6, wherein the support stop includes a plurality of tongues projecting in a plane perpendicular to the axis of the piston.

8. The valve of claim 5, wherein in the open position of the valve a length from a bottom of the piston to a top of the sleeve is equal to a length from the bottom of the piston to a bottom of the windows so as to leave the windows completely unobstructed.

9. The valve of claim 5, wherein in the closed position of the valve a top of the sleeve is disposed above a top of the windows so that the windows are completely obstructed by the sleeve.

\* \* \* \* \*